United States Patent [19]
Falk

[11] 3,848,783
[45] Nov. 19, 1974

[54] BICYCLE LOCK CARRYING BRACKET
[75] Inventor: Sidney Falk, Chicago, Ill.
[73] Assignee: Fort Lock Corporation, River Grove, Ill.
[22] Filed: Apr. 12, 1973
[21] Appl. No.: 350,347

[52] U.S. Cl.................. 224/39 R, 224/42, 242/85.1
[51] Int. Cl.............................................. B62j 11/00
[58] Field of Search............ 224/39 R, 38, 37, 32 R, 224/35, 42, 29 R; 24/81 CC, 259 A, 71.3; 242/85.1

[56] References Cited
UNITED STATES PATENTS
| 600,887 | 3/1898 | Pettit | 24/259 A |
| 2,426,479 | 8/1947 | Wohlhieter | 24/81 CC |
| 3,636,595 | 1/1972 | Wines | 24/81 CC |

FOREIGN PATENTS OR APPLICATIONS
77,882    5/1931    Sweden............................ 242/85.1

Primary Examiner—Robert G. Sheridan
Assistant Examiner—G. L. Auton
Attorney, Agent, or Firm—Wolfe, Hubbard, Leydig, Voit & Osann Ltd.

[57] ABSTRACT

For carrying a bicycle lock of the type including a flexible cable or chain, a bracket is mounted to a tubular frame member of the bicycle. The bracket has a detent latching means for attaching it to the tubular bicycle frame member and a cross member having pleat-like folds at its outboard ends to hold the flexible cable or chain in a coil-like manner.

3 Claims, 4 Drawing Figures

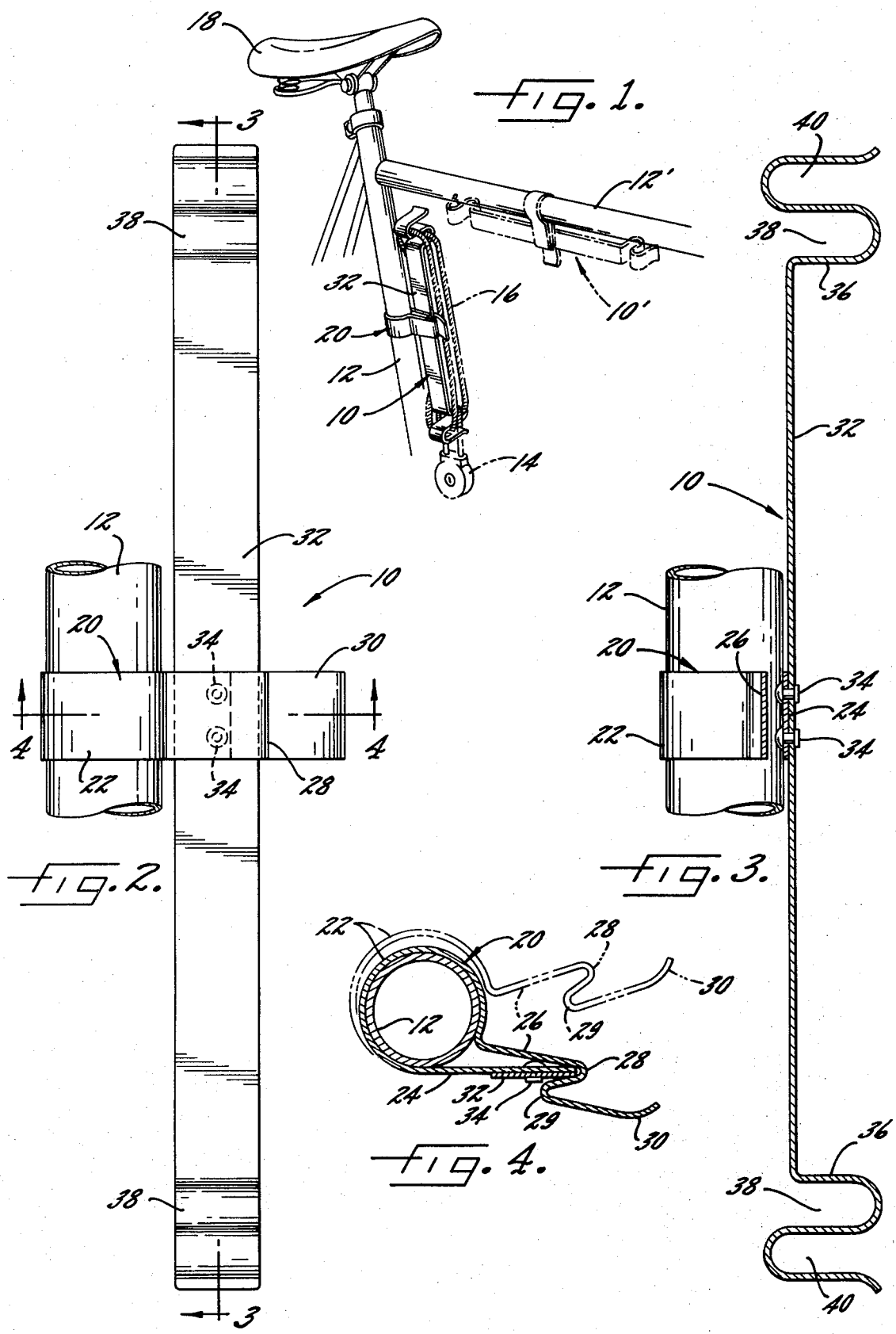

BICYCLE LOCK CARRYING BRACKET

BACKGROUND OF THE INVENTION

The invention relates generally to bicycle lock carrying brackets and more particularly to a bracket for carrying a bicycle lock of the type having a flexible cable or chain attached thereto and which may be easily mounted to a bicycle tubular frame support member and securely fastened thereto without the need for any tools.

SUMMARY OF THE INVENTION

The primary aim of the present invention is to provide a novel bracket arrangement for carrying a bicycle lock with a flexible cable or chain attached which is extremely simple in construction, and easily mounted to the bicycle frame without use of any tools. More specifically, this is accomplished by a bracket having a clamp portion which encircles one of the tubular frame members of the bicycle and a detent latching arrangement securely fastens the clamp in place. A further aim is to provide a novel bracket arrangement that enables the flexible cable or chain of the lock to be coiled about the bracket and held securely in place, yet permits easy removal when the lock is needed to secure the bicycle from possible theft. Other objects and advantages of the invention will become apparent from the following detailed description taken in connection with the accompanying drawings.

BRIEF DESCRIPTION OF THE DRAWING

FIG. 1 is a perspective view of a fragmentary portion of a bicycle frame illustrating the manner in which the novel bracket may be mounted to support a bicycle lock in accordance with the present invention;

FIG. 2 is an enlarged plan view of the bracket of FIG. 1 with the lock removed and a portion of the frame member to which the bracket is mounted being shown in fragmentary;

FIG. 3 is a side view of the bracket taken substantially along the line 3—3 of FIG. 2; and FIG. 4 is a cross-sectional view taken along the line 4—4 of FIG. 2.

DESCRIPTION OF THE PREFERRED EMBODIMENT

As shown in the drawings for purposes of illustration as viewed in FIG. 1, the invention is embodied in a bracket generally indicated at 10 which is adapted to be mounted to a tubular frame member 12 of a bicycle and to carry a lock 14 of the type having a flexible cable or chain 16 attached to the lock. The bracket 10 as shown in FIG. 1 may be conveniently attached to an upright frame member 12 such as the seat 18 support or such other tubular support 12' as shown by the bracket 10' in phantom.

In the present instance, referring to FIGS. 2 and 4, conjointly, the bracket 10 includes a clamp member 20 having a generally C-shaped portion 22 which terminates in extended resiliently yieldable legs 24 and 26. Leg 26 includes a detent latching arrangement comprising an inwardly folded over portion 28 and an outwardly folded over portion 29 such that the end 30 is spaced from the portion 28 which interconnects with the C-shaped portion 22. The fold 28 is positioned such that it receives the end of leg 24 which snaps into the pocket formed by fold 28. As shown in FIG. 4, the arrangement is such that the clamp may be placed over the bicycle frame tube member 12 and the legs 24, 26 snap together so that the C-shaped member 22 is snugly wrapped around the tube 12 and held thereto.

In carrying out the present invention an elongated strap member 32 is secured approximately intermediate its ends transversely to the clamp leg 24 with the attachment being by suitable fastening means such as rivets 34. At each end of the strap 32 there is provided a bent over flange 36 with the flanged end being formed into a pleat-like configuration having an inwardly facing pocket 38 and an outwardly facing pocket 40. The arrangement is such that a flexible lock cable or chain may be coiled about the elongated strap ends with a varying during wrapping between the passages through respective pockets 38 and 40 to prevent the coiled cable from slipping off the bracket. The bracket strap 32 itself being slightly flexible permits the ends to be flexed towards each other when the flexible cable is wrapped around the strap ends so that the tendency of the ends 36 to bias outwardly further serves to hold the flexible lock cable 16 in place on the bracket strap.

From the foregoing it will be apparent that the novel bicycle lock carrying bracket arrangement of the clamp 20 and strap 32 gives a simple and inexpensive structure with which to carry a flexible cable or chain type bicycle lock. It is apparent that, with the ease of installation afforded by the clamp, it may be readily attached to one of the tubular frame support members of a conventional bicycle in an out of the way manner yet rendering the lock easily available for use when needed.

I claim as my invention:

1. A bracket for connection with a tubular frame member of a bicycle for carrying a lock of the type including a flexible cable, said bracket comprising a clamp having a generally C-shaped body portion terminating in resiliently yieldable first and second legs projecting outwardly from said body portion, said first leg including a detent latching means adapted to attachably receive said second leg for clamping said C-shaped portion about said tubular frame member, an elongated flexible strap transversely connected to one of said legs intermediate the ends of said strap, and the opposite ends of said strap including bent over flanges defining inwardly and outwardly facing pockets extending perpendicular to said strap so that the flexible bicycle lock cable may be coiled about the strap ends when they are flexed towards one another and when said strap ends are released they resiliently hold the coiled lock cable on said bracket.

2. A bracket as claimed in claim 1 wherein said detent latching means comprises an inwardly folded over portion and an outwardly folded over portion.

3. A bracket as claimed in claim 1 wherein said strap is connected to the second leg received by said first leg including the detent latching means.

* * * * *